(12) United States Patent
Kent et al.

(10) Patent No.: US 9,709,098 B2
(45) Date of Patent: Jul. 18, 2017

(54) ROLLER BEARING SPRING CLIP

(71) Applicant: Super ATV, LLC, Madison, IN (US)

(72) Inventors: Dennis Kent, Madison, IN (US); Chris Shelton, Madison, IN (US); Jordan E. Stephan, Hanover, IN (US); Penny Zuckschwerdt, Madison, IN (US); Dongning Zhao, Madison, IN (US); Jason Stewart, Harvest, AL (US)

(73) Assignee: Super ATV, LLC, Madison, IN (US)

( * ) Notice: Subject to any disclaimer, the term of this patent is extended or adjusted under 35 U.S.C. 154(b) by 4 days.

(21) Appl. No.: 15/019,150

(22) Filed: Feb. 9, 2016

(65) Prior Publication Data

US 2017/0023063 A1    Jan. 26, 2017

Related U.S. Application Data

(60) Provisional application No. 62/136,370, filed on Jul. 24, 2015.

(51) Int. Cl.
*F16C 33/46* (2006.01)
*F16C 33/48* (2006.01)
*F16C 19/28* (2006.01)

(52) U.S. Cl.
CPC ............ *F16C 33/467* (2013.01); *F16C 19/28* (2013.01); *F16C 33/48* (2013.01)

(58) Field of Classification Search
CPC .... F16C 19/28; F16C 33/467; F16C 33/4676; F16C 33/48
See application file for complete search history.

(56) References Cited

U.S. PATENT DOCUMENTS

| 3,312,511 | A | | 4/1967 | Synek |
| 3,630,330 | A | * | 12/1971 | Pflugner ............... F16D 41/067 |
| | | | | 192/45.008 |
| 3,972,573 | A | * | 8/1976 | Marola ................. F16D 41/067 |
| | | | | 192/45.008 |
| 4,215,904 | A | | 8/1980 | Teramachi |
| 5,647,674 | A | | 7/1997 | Ohashi et al. |
| 5,743,660 | A | | 4/1998 | Hillmann |
| 6,629,590 | B2 | | 10/2003 | Ochab et al. |
| 7,874,413 | B2 | | 1/2011 | Saito et al. |

(Continued)

FOREIGN PATENT DOCUMENTS

| DE | 1954642 A1 | 5/1971 |
| DE | 102012221846 A1 | 6/2014 |

OTHER PUBLICATIONS

Machine Translation of DE102012221846A1 by Lexis Nexis Total Patent on Jun. 9, 2015.

(Continued)

*Primary Examiner* — James Pilkington
(74) *Attorney, Agent, or Firm* — Woodard, Emhardt, Moriarty, McNett & Henry LLP

(57) ABSTRACT

Certain embodiments of the present disclosure describe a clip for biasing and maintaining rollers within an opening of the roller bearing assembly. The clip includes a connecting segment, a resilient portion, and an anchor portion. The clip may be attached to a roll cage with openings for rollers. The resilient portion of the clip extends into an opening and contacts the roller when a roller is received in the opening. The anchor portion is positioned in an adjacent opening and abuts the roll cage.

18 Claims, 6 Drawing Sheets

(56) References Cited

U.S. PATENT DOCUMENTS

| | | |
|---|---|---|
| 7,963,702 B2 | 6/2011 | Ozu |
| 8,157,069 B2 * | 4/2012 | Altmann ............... F16D 41/067 |
| | | 192/45.004 |
| 2008/0037922 A1 * | 2/2008 | Hayashi .............. F16C 33/4611 |
| | | 384/572 |
| 2014/0013603 A1 | 1/2014 | Miyachi |

OTHER PUBLICATIONS

Machine Translation of DE1954642A1 by Lexis Nexis Total Patent on Jun. 9, 2015.

* cited by examiner

ROLLER BEARING SPRING CLIP

CROSS REFERENCE TO RELATED APPLICATIONS

This application claims priority to U.S. Provisional Patent Application No. 62/196,370, filed Jul. 24, 2015; which is incorporated herein by reference.

BACKGROUND

This disclosure is in the field of roller bearings.

Roller bearings operate by placing rotating elements between two races along which the rotating elements may roll. Roller bearings have many applications and may be used in a variety of products that are subjected to radial loads, such as conveyer belts or in a roller clutch for an automatic transmission to allow the transmission to smoothly switch gears.

Roller bearings often include a roll cage and rollers positioned around the roll cage, and may be used to transmit torque between two surfaces. However, the efficient transmission of torque can be affected by the position of the rollers within the roll cage. Therefore, it is desirable to have a device that is capable of positioning and maintaining the rollers in a desired position.

SUMMARY

Disclosed is clip for use positioning rollers in a roll cage that defines adjacent openings for receiving rollers and a groove that extends between the adjacent roller openings, the clip including a connection segment with two ends where the connection segment fits in the groove between adjacent roller openings, a resilient portion attached to one end of the connection segment, wherein the resilient portion fits in an opening on one side of the groove, where the resilient portion has a midpoint and the connection segment has a midpoint, and where the connection segment midpoint is not aligned with the resilient portion midpoint, an anchor portion attached to an opposite end of the connection segment, where the anchor portion fits in the opening on the other side of the groove, where, when attached to the roll cage, the resilient portion extends into the first opening and contacts and biases the roller away from the resilient portion when the roller is received in the opening.

The disclosed clip may also include other features. For example, the anchor portion defines a midpoint that is not aligned with a midpoint of the connection segment. In another example, the connection segment may be attached to the anchor portion with an edge of the connection segment approximately aligned with the anchor portion midpoint. In yet another example, the connection segment may be attached to the resilient portion so that an edge of the connection segment approximately alignes with the resilient portion midpoint. In a further example, an entire length of the anchor portion may be adapted to contact the roll cage. In another example, the resilient portion may include two curved arms that extend away from both each other and the connection segment.

Also disclosed is a clip for positioning rollers within a roll cage that includes a connection segment, a resilient portion attached to a first end of the connection segment and extending away from the connection segment, an anchor portion attached to a second end of the connection segment such that a midpoint of the connecting segment is offset from the resilient portion midpoint a distance of at least half of the width of the connection segment.

Also discloses is a roller bearing assembly that includes a roll cage with roller opening for receiving rollers and grooves extending between roller openings, rollers positioned in the roller openings, clips that include connection segments, anchor portions and resilient portions, with two clips spanning a linking portion between pairs of adjacent openings with the connection segment spanning the linking portion and with each opening including the anchor portion of one clip and the resilient portion of the other clip with the resilient portion of each clip contacting the roller in each opening and biasing that roller away from the resilient portion.

In this respect, and before explaining the disclosed invention in detail, it is to be understood that the claimed invention is not limited in its application to the details of the construction or the arrangement of components described below and illustrated in the drawings. The claimed invention is capable of other embodiments and can be carried out in various ways. It should also be understood that the phraseology and terminology employed herein are for the purpose of the description and should not be regarded as limiting. To the accomplishment of the above and related objects, the claimed invention may be embodied in the form illustrated in the accompanying drawings, attention being called to the fact, however, that the drawings are illustrative only, and that changes may be made in the specific construction illustrated and described within the scope of this application.

DETAILED DESCRIPTION OF THE DRAWINGS

Figure 1:
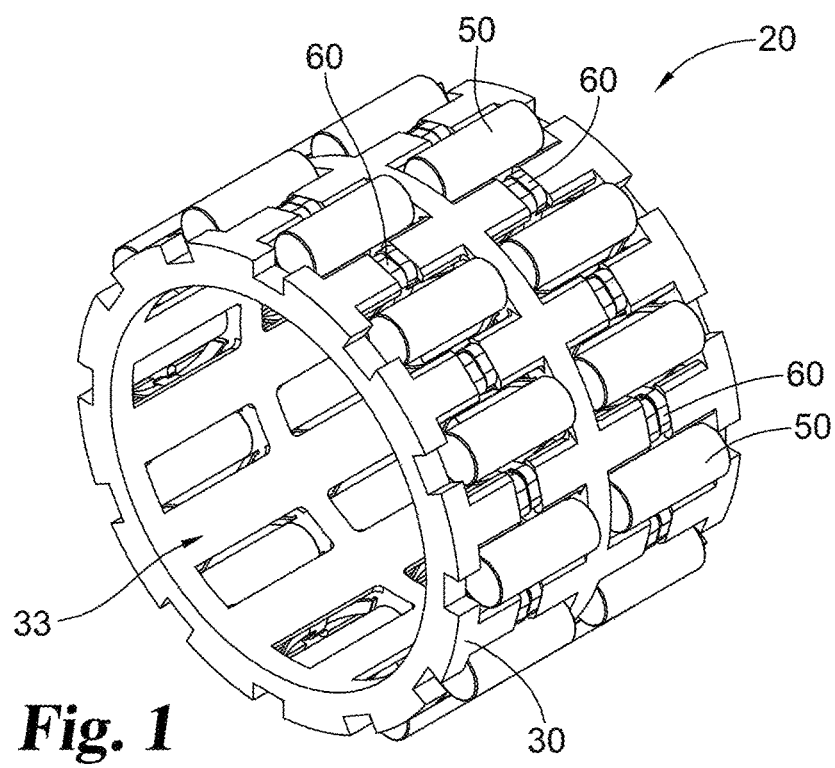
FIG. 1 is a perspective view of a roller bearing assembly.

Reference will now be made to certain embodiments and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which this disclosure relates. In several figures, where there are the same or similar elements, those elements are designated with the same or similar reference numerals.

The present disclosure pertains to a roller bearing assembly including clips for biasing and maintaining rollers within an opening of the roller bearing assembly. Aspects of the present disclosure include a roll cage defining openings for receiving rollers. In certain embodiments, grooves are present in a linking portion of the roll cage that extends between adjacent openings.

A clip including a connection segment, a resilient portion, and an anchor portion is attached to the roll cage so the resilient portion is located in an opening and the anchor portion is located in an adjacent opening. The connection segment spans the linking portion of the roll cage between adjacent openings. In embodiments where there are grooves between adjacent openings, the connection segment maybe positioned in a groove.

In certain embodiments, the connection segments of two clips are placed into one of the grooves between adjacent openings. The clips are arranged so the resilient portion of the first clip and the anchor portion of the second clip are located in the same opening. Likewise, the anchor portion of the first clip and the resilient portion of the second clip are located in the adjacent opening. The anchor portions of the clips abut the walls of the roll cage, while the resilient portion of the clips overlap the anchor portion located in the same opening. The resilient portions extend into the openings so that they contact a roller that is received in the opening.

This clip arrangement may be repeated for each pair of adjacent openings so there are two resilient portions positioned in each opening. The two resilient portions in each opening work together hold a roller within the opening and bias the roller toward the center of the opening.

FIG. 1 illustrates a roller bearing assembly 20. The roller bearing assembly includes a roll cage 30 and rollers 50 positioned in roller openings 34 (see FIG. 2) defined in roll cage 30. Clip assemblies 60 are mounted on roll cage 30. The clip assemblies 60 include resilient portions that contact rollers 50 to help position rollers 50 within roll cage 30.

Figure 2:
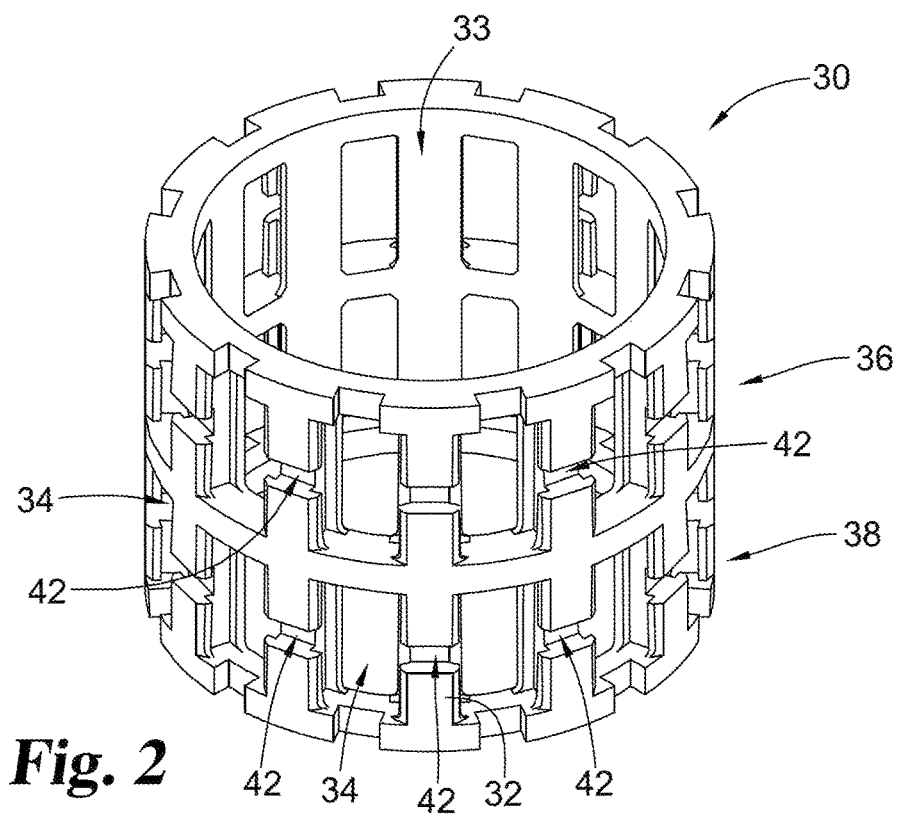
FIG. 2 is a perspective view of a roll cage from the roller bearing assembly of FIG. 1.

As seen in FIG. 2, roll cage 30 includes a roll cage body 32 defining a hollow cylindrical shape with a central opening 33. Roll cage body 32 defines a plurality of openings 34 through roll cage body 32. Each of the openings 34 are adapted to allow a roller 50 to reside inside. In the illustrated embodiment, there are two rows 36, 38 of openings 34. Each of the rows 36, 38 circles around the circumference of roll cage body 32. In other embodiments, the number of rows of openings 34 may be varied. For example, roll cage body 32 may only include a single row of openings 34 or may have three, four, or any other desired number of rows of openings 34.

Roll cage body 32 also optionally defines a plurality of grooves 42 positioned between adjacent openings 34 within the same row 36 or 38. Grooves 42 are positioned to receive a clip assembly 60 as described below. In the embodiment shown in FIG. 2, grooves 42 are positioned at midpoint of the edge of each opening 34; however, in other embodiments, the position of groove 42 in relation to opening 34 may be moved to a location other than the midpoint. Also, it is not required that each groove 42 is positioned in the same location between its adjacent openings 34. For example, some grooves 42 may be positioned at the midpoint of its adjacent openings 34, and other grooves 42 may be positioned above or below the midpoint of adjacent openings 34. In addition, while a single groove 42 is shown between each pair of openings 34, other embodiments could optionally include two or more grooves between each pair of openings.

Figure 3:
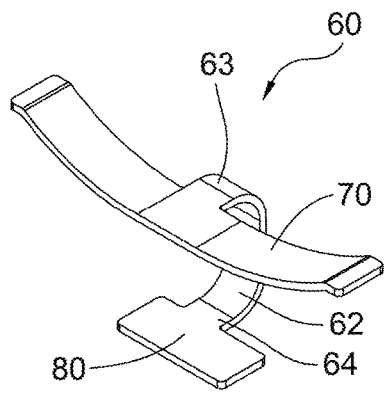
FIG. 3 is a perspective view of a clip from the roller bearing assembly of FIG. 1.
Figure 4:
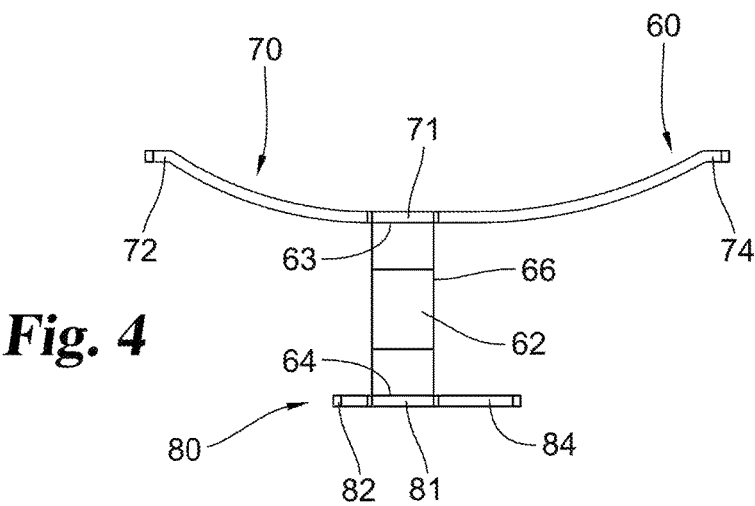
FIG. 4 is a top plan view of the clip from FIG. 3.
Figure 5:
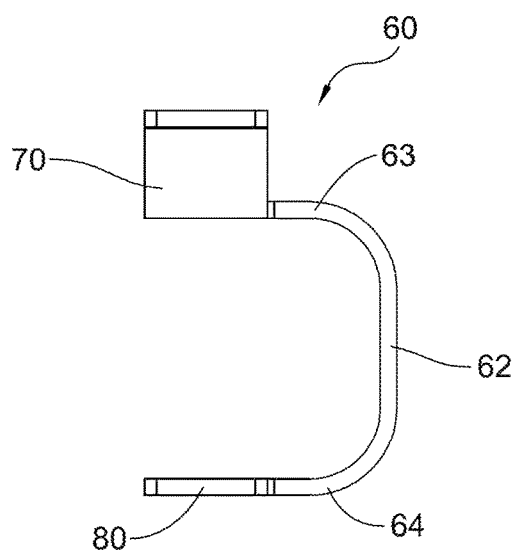
FIG. 5 is a side elevational view of the clip from FIG. 3.

A representative example of a clip assembly 60 is shown in FIGS. 3-4. Clip assembly 60 includes a connection segment 62 that has two ends 63, 64 that are arched and define a U-shape (as best seen in FIG. 5). End 63 of connection segment 62 includes a resilient portion 70, while end 64 of connection segment 62 includes an anchor portion 80.

Resilient portion 70 is formed from an elastic material that exhibits a large elastic deformation range. As an example, resilient portion 70 may be made from spring steel or another suitable metal. Resilient portion 70 is connected to connection segment 62 at connection point 71. In the embodiment shown, resilient portion 70 includes two arms 72, 74 that extend in opposite direction from connection point 71. As best seen in FIG. 4, arms 72, 74 are curved so arms 72, 74 extend away from connection segment 62. Also, as best seen in FIG. 4, arms 72 and 74 are not symmetrical with respect to each other.

Anchor portion 80 is connected to end 64 of connection segment 62 at connection point 81, opposite from resilient portion 70. In some embodiments, anchor portion 80 may include arms 82, 84 that extend in opposite directions from connection point 81. Unlike, resilient portion 70, arms 82, 84 of anchor portion 80 do not curve away from connection segment 62. Instead, anchor portion 80 is substantially planar in shape.

Figure 6:
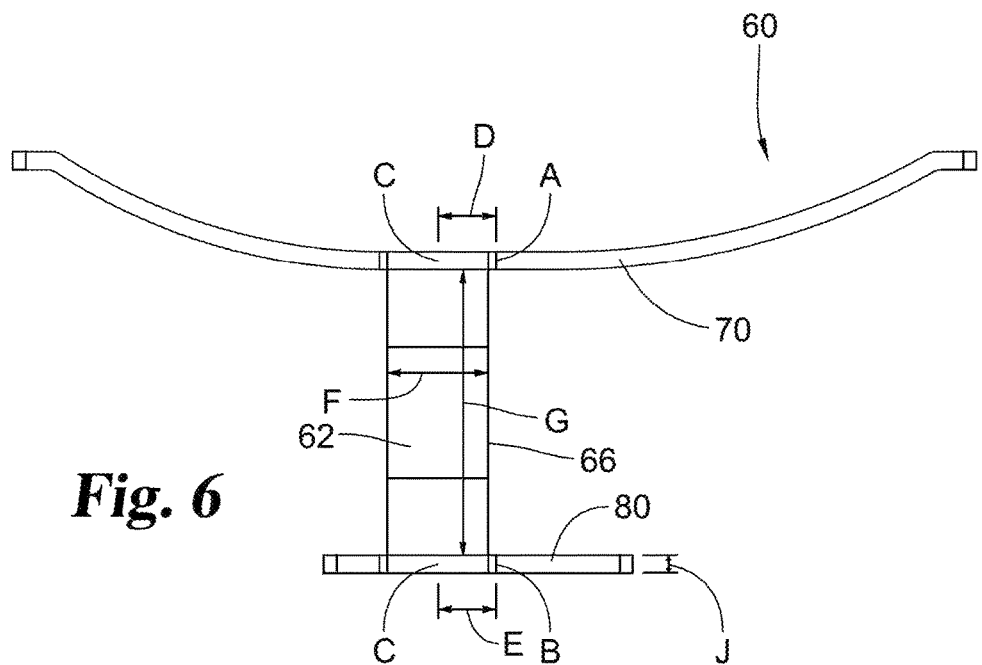
FIG. 6 is a top plan view of the clip from FIG. 3.

As illustrated in FIG. 6, connection segment 62 is offset from the center of both resilient portion 70 and anchor portion 80. The distance of the offset of connection segment 62 may be defined in a variety of ways. For example, connection segment 62 may be offset so an edge 66 of connection segment 62 is located approximately at resilient portion midpoint A and anchor portion midpoint B of anchor portion 80. In some embodiments, connection segment 62 may be attached to resilient portion 70 so the midpoint C of connection segment 62 is located a distance, D, equal to at least half of the width F of the connection segment from the midpoint A of resilient portion 70. Additionally, in some embodiments, the midpoint C of connection segment 62 is located a distance, E, equal to at least half of the width F of the connection segment from the midpoint B of anchor portion 80. In other embodiments, connection segment 62 may be offset an even greater distance, so edge 66 is further from midpoints A, B. In the embodiment shown in FIG. 4, because of the offset, arm 74 of resilient portion 70 is longer than arm 72, and arm 84 of anchor portion is longer than arm 82.

Connection segment 62 is also dimensioned so the length G of connection segment 62 is at least greater than the length, M, of groove 42 (see FIG. 7), plus the thickness J of anchor portion 80.

Figure 7:
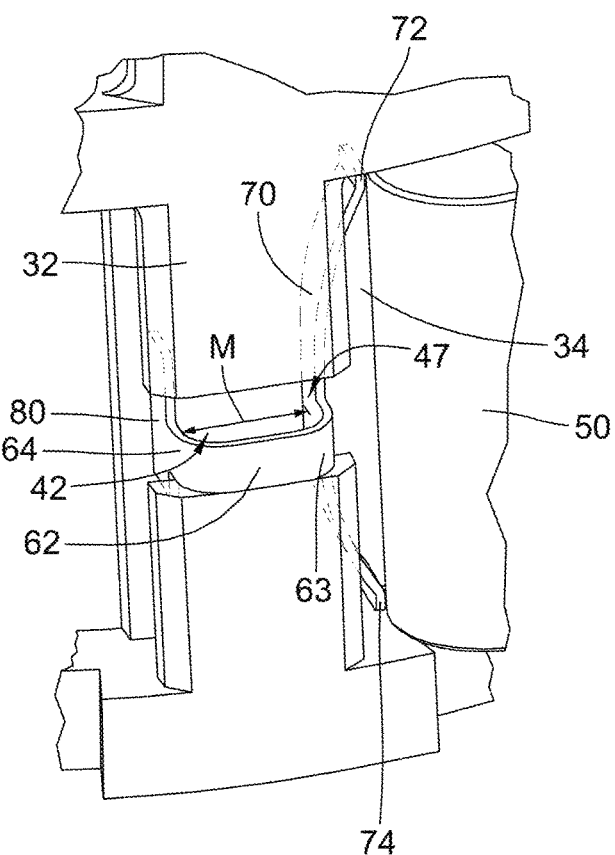
FIG. 7 is a perspective view of the clip from FIG. 3 positioned in a groove in the roll cage from FIG. 2.

FIG. 7 shows a single clip assembly 60 positioned in roll cage 30 to abut a roller 50 in opening 34. As shown, clip assembly 60 is positioned so connection segment 62 is positioned within groove 42 on roll cage 30. Connection segment 62 is longer than groove 42, so that the U-shape of connection segment 62 results in end 63 extending into an opening 34 and the other end 64 extending into an adjacent opening 34. When connection segment 62 is in groove 42 with anchor portion 80 abutting roll cage 30, resilient portion 70 is positioned inside one of the openings 34 and is spaced apart from roll cage 30 by a gap 47.

When connection segment 62 is positioned in groove 42, resilient portion 70 extends into an opening 34. When a roller 50 is positioned in opening 34, a portion of resilient portion 70 contacts roller 50. In the embodiment shown, arms 72, 74 of resilient portion 70 curve away from connection segment 62 and into roller opening 34 so that resilient portion 70 contacts roller 50 at the ends of arms 72, 74.

Anchor portion 80 of clip assembly 60 is located in an opening adjacent to the opening in which resilient portion 70 is located. In contrast to resilient portion 70, anchor portion 80 does not extend into opening 34. Instead, anchor portion 80 is flat so the length of one side of anchor portion 80 abuts roll cage 30.

Connection segment 62 may be dimensioned so it does not fill the entire width of groove 42. As seen in FIG. 7, in some embodiments, connection segment 62 may have a width that is at most half the width of groove 42. Therefore when connection segment 62 is positioned in groove 42, there is an empty space in groove 42 between connection segment 62 and roll cage body 32 for an additional connection segment to be added to groove 42 as described below. Additionally, the offset of connection segment 62 relative to the position of resilient portion 70 and anchor portion 80 allows the position of connection segment 62 to be offset from the center of groove 42, while resilient portion 70 can be centered within opening 34.

Figure 8:
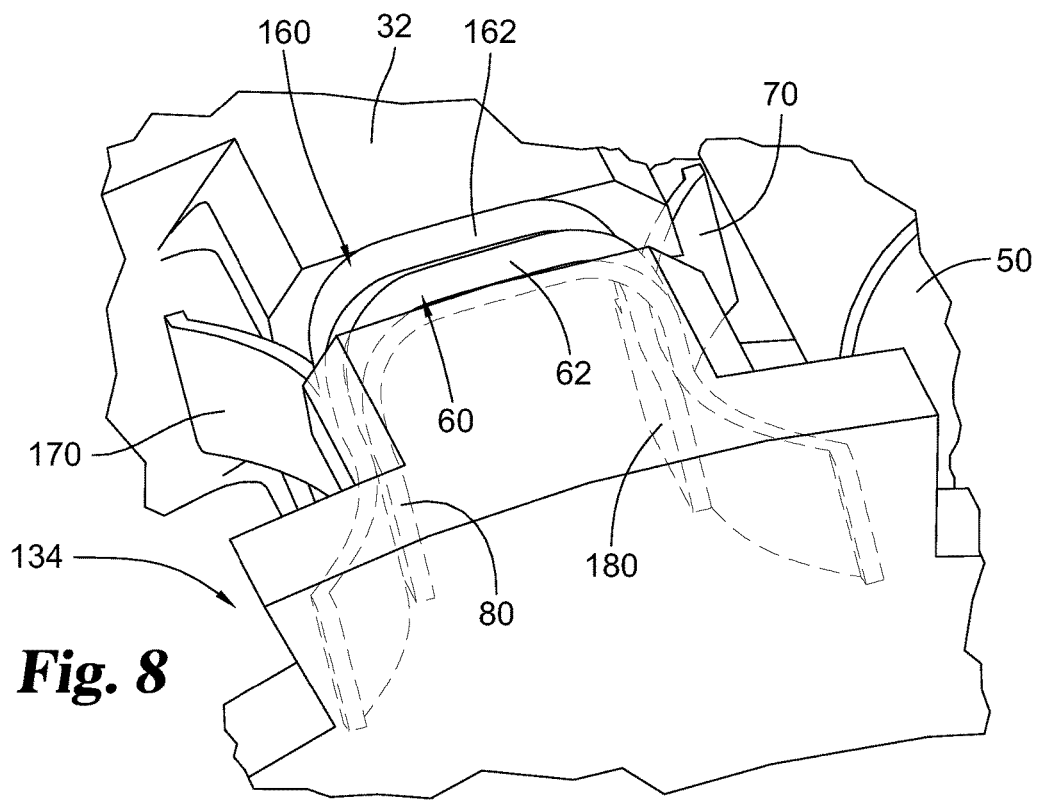
FIG. 8 is a perspective view of two clips positioned in a groove in the roll cage from FIG. 2.

As shown in FIG. 8, a second clip assembly 160 may also be positioned in groove 42. The connection segment 162 of the second clip fits into groove 42 in the empty space that is not used by the connection segment 62 of the first clip. Because connection segment 62 is dimensioned so the length G (see FIG. 6) of connection segment 62 is at least greater than the length, M, of groove 42 plus the thickness J (see FIG. 6) of anchor portion 80. This allows the resilient portion 70 of one of the clips to overlap the anchor portion 80 of the other clip positioned in groove 42.

The first clip assembly 60 is configured so its resilient portion 70 is positioned in a first opening 34, and its anchor portion 80 is positioned in a second opening 134. The second clip assembly 160 is configured so its resilient portion 170 is positioned in second opening 134 and its anchor portion 180 is positioned in first opening 34. Resilient portion 70 is placed on top of anchor portion 180 and resilient portion 170 is placed on top of anchor portion 80. Therefore, in opening 34, anchor portion 180 is between roll cage 30 and resilient portion 70. In opening 134, anchor portion 80 is between roll cage 30 and resilient portion 170. This configuration allows resilient portions 70 and 170 to extend into their respective openings 34, 134 and contact rollers 50 positioned in opening 34 or opening 134 while entrapping anchor portions 80 and 180 between resilient portions 70 and 170 and roll cage 30.

Figure 9:
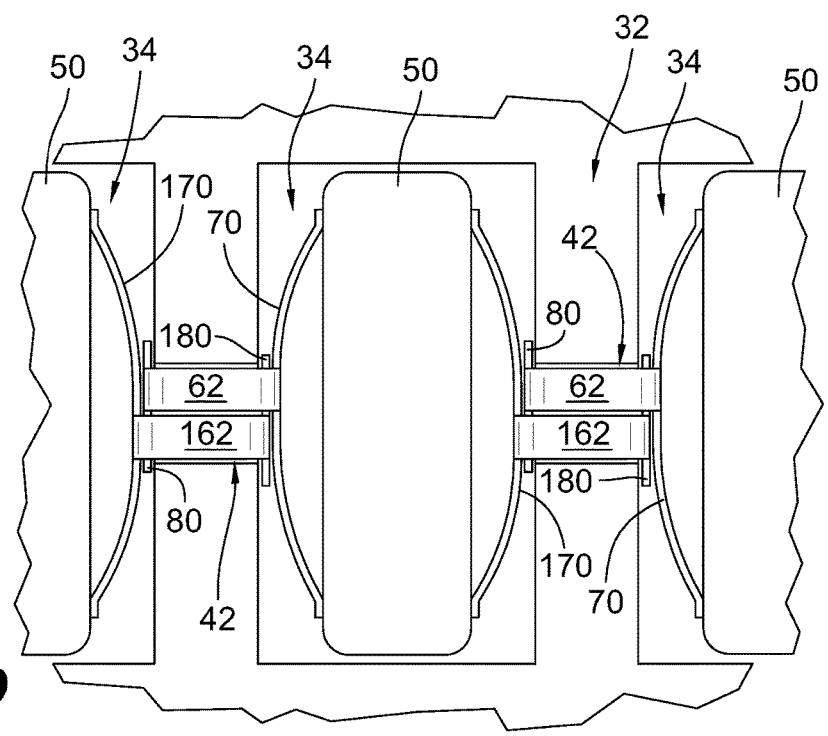
FIG. 9 is a plan view of a series of openings with rollers inserted from the roller bearing assembly of FIG. 1.

FIG. 9 shows a series of openings 34 with rollers 50 positioned in the openings. Grooves 42 extend between adjacent openings 34. A pair of clips are positioned in each groove 42 and positioned in the arrangement described above and shown in FIG. 7. A resilient portion 70 of a clip extends into each side of opening 34. The resilient portions 70 contact roller 50 and bias roller 50 toward the center of opening 34. If the roller 50 moves laterally in either direction, it applies force to one of the resilient portions 70. However, the resiliency of resilient portion 70 biases roller 50 toward the center of opening 34. The resilient portion 70 of a clip covers the anchor portion 80 of a clip residing in the same groove 42, so the anchor portions 80 do not contact roller 50. This set up is repeated in series for each row of openings, so each opening 34 has a pair of resilient portions 70 that help keep roller 50 in place (see FIG. 1).

Figure 10:
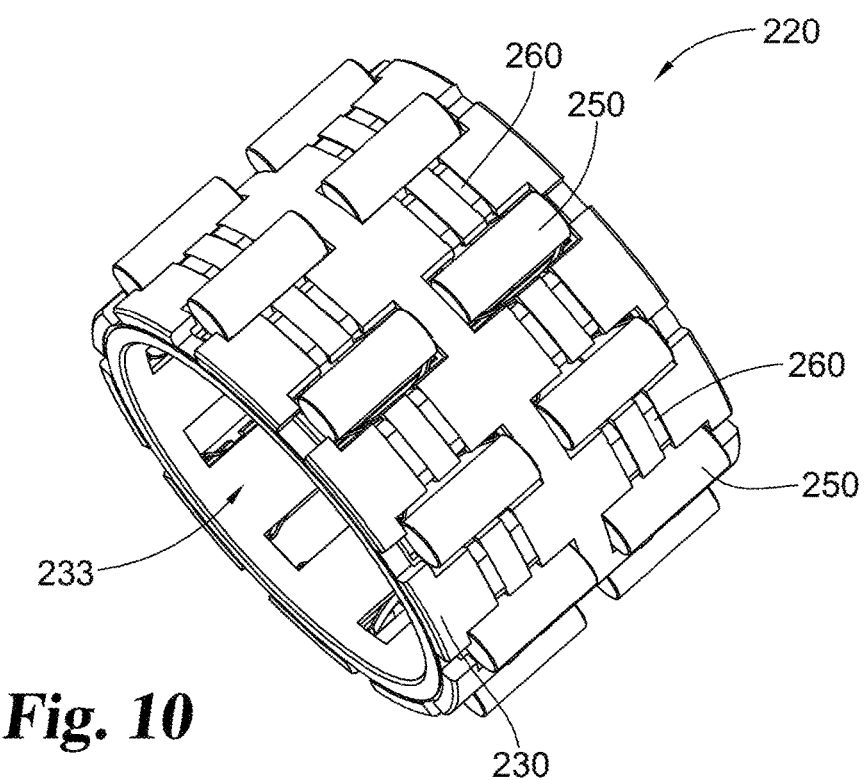
FIG. 10 is a perspective view of an alternative embodiment of a roller bearing assembly.

FIG. 10 illustrates an alternative embodiment as a roller bearing assembly 220. Roller bearing assembly 220 is similar to roller bearing assembly 20; however, the clip assemblies 60 are different and are inserted into two spaced apart grooves located between adjacent openings 234 instead of a single groove 42. Similar to roller bearing assembly 20 shown in FIG. 1, roller bearing assembly 220 includes a roll cage 230 and rollers 250 positioned in roller openings 234 (see FIG. 11) defined in roll cage 230. Clip assemblies 260 are mounted on roll cage 230 on either side of each roller 250 to bias rollers 250 toward the middle of openings 234.

Figure 11:
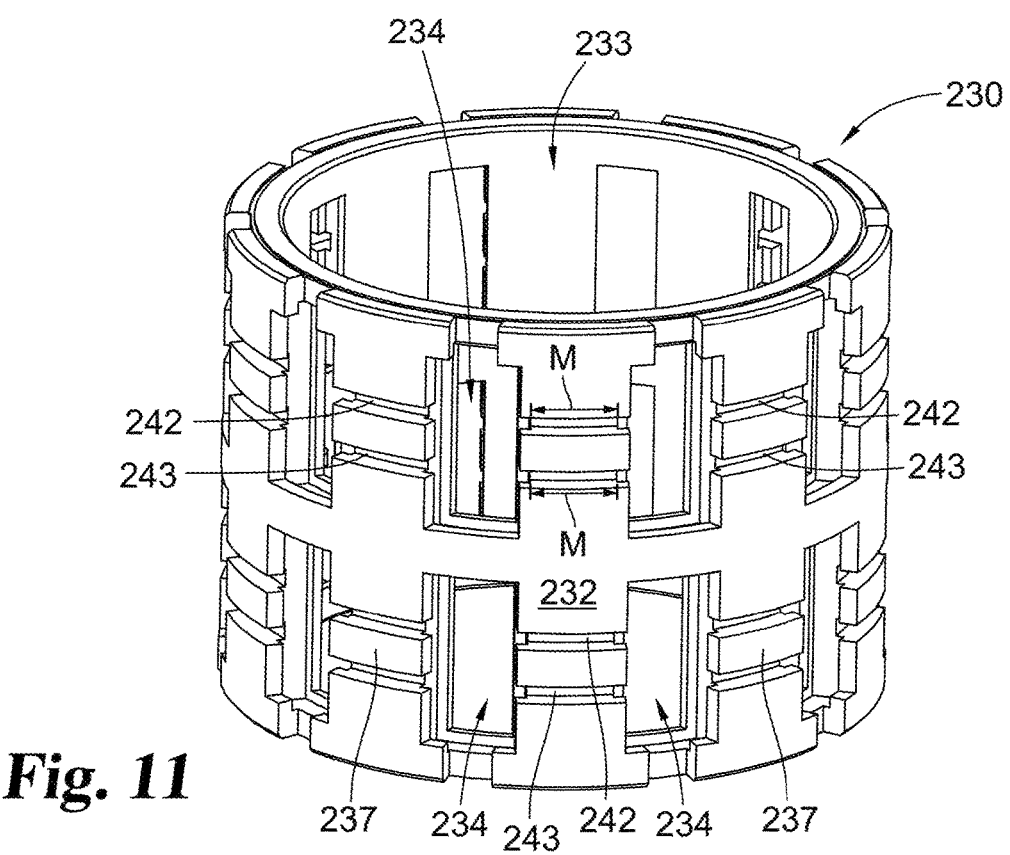
FIG. 11 is a perspective view of a roll cage from the roller bearing assembly of FIG. 10.

As seen in FIG. 11, roll cage 230 includes a roll cage body 232 defining a hollow cylindrical shape with a central opening 233. Roll cage body 232 also defines a plurality of openings 234 through roll cage body 232. Each of the openings 234 are adapted to allow a roller 250 to reside inside. An upper groove 242 and a lower groove 243 are positioned between each of the adjacent openings 234. A separation portion 237 of roll cage body 232 is positioned between upper groove 242 and lower groove 243. A portion of roll cage body 232 provides separation between upper groove 242 and groove 243. Each groove 242, 243 is adapted to receive a clip assembly 260.

Figure 12:
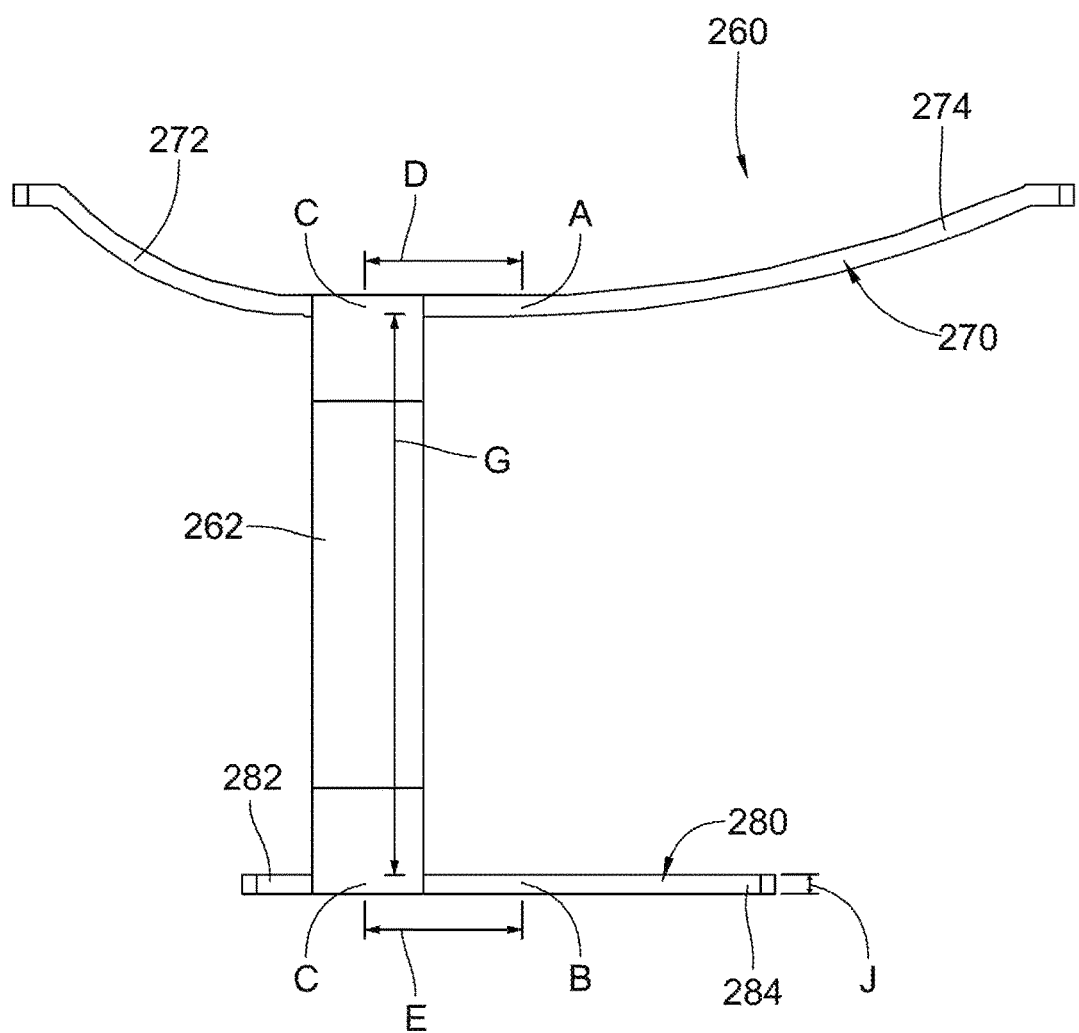
FIG. 12 is a top plan view of the clip the roller bearing assembly of FIG. 10.

As shown in FIG. 12, clip assembly 260 is similar to clip assembly 60 shown in FIGS. 3-6. Clip assembly 260 includes a connection segment 262, a resilient portion 270, and an anchor portion 280. Connection segment 262 is offset from the center of resilient portion 270 and anchor portion 280. The distance D from the midpoint C of connection segment 262 to the midpoint A of resilient portion 270 may be equal to the distance from the midpoint of opening 234 to the midpoint of groove 242 or groove 243. This allows resilient portion 270 to remain centered in opening 234 despite grooves 242, 243 not being located at the midpoint of opening 234. Likewise, the distance E from the midpoint C of connection segment 262 to the midpoint B of anchor portion 280 may also be equal to the distance from the midpoint of opening 234 to the midpoint of groove 242 or groove 243. Because grooves 242, 243 are not centered like groove 42 in FIG. 1, offset D of resilient portion 270 and offset E of anchor portion 280 for clip assembly 260 may be greater than offsets D and E for clip assembly 60.

Also, similar to clip assembly 60, connection segment 262 of clip assembly 260 is dimensioned so the length G of connection segment 262 is approximately equal to the length M of groove 242 or 243 (see FIG. 11), plus the thickness J of anchor portion 80. This allows the resilient portion of 270 a clip assembly 260 inserted into groove 242 to extend over and rest on the anchor portion 280 a clip assembly 260 inserted into groove 243.

In the embodiment shown in FIG. 12, resilient portion 270 includes two arms 272, 274. Arm 274 may optionally be longer than arm 272 to help center resilient portion 270 relative to individual openings 234 when clip assembly 260 is attached to roll cage 230. The longer arm 274 may help center resilient portion 270 in opening 234 despite grooves 242, 243 not being centered between adjacent openings 234.

Similarly, in some embodiments, anchor portion 280 includes two arms 282 and 284. Arm 284 is optionally longer than arm 282 to help center anchor portion 280 with respect to opening 234. This may also position arm 284 under resilient portion 270.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

The invention claimed is:

1. A clip for positioning rollers within a roll cage that defines adjacent first and second openings for receiving first and second rollers and a groove between the adjacent first and second openings, the clip comprising:
   a connection segment including two ends wherein said connection segment fits in the groove between adjacent roller openings;
   a resilient portion attached to one end of said connection segment, wherein said resilient portion fits in the first opening, wherein said resilient portion defines a midpoint and said connection segment defines a midpoint, and wherein said connection segment midpoint is not aligned with said resilient portion midpoint;
   an anchor portion attached to an opposite end of said connection segment, wherein said anchor portion fits in the second opening adjacent to the first opening in which said resilient portion is positioned; and
   wherein, when attached to the roll cage, said resilient portion extends into the first opening and is adapted to contact and bias the first roller away from said resilient portion when the first roller is received in the first opening of the roll cage.

2. The clip of claim 1, wherein said anchor portion defines a midpoint, and wherein said connection segment midpoint is not aligned with said anchor portion midpoint.

3. The clip of claim 2, wherein said connection segment is attached to said anchor portion so an edge of said connection segment is approximately aligned with said anchor portion midpoint.

4. The clip of claim 1, wherein said connection segment is attached to said resilient portion so an edge of said connection segment is approximately aligned with said resilient portion midpoint.

5. The clip of claim 1, wherein an entire length of said anchor portion is adapted to contact the roll cage.

6. The clip of claim 1, wherein said resilient portion includes two curved arms extending away from each other, and wherein said curved arms extend away from said connection segment.

7. A clip for positioning rollers within a roll cage, the clip comprising:
   a connection segment including a width, a midpoint, a first end, and a second end;
   a resilient portion including a midpoint, wherein said resilient portion is attached to said first end of said connection segment and wherein said resilient portion extends away from said first end of said connection segment;
   an anchor portion, wherein said anchor portion is attached to said second end of said connection segment; and
   wherein said connection segment is attached to said resilient portion so said connection segment midpoint is offset a distance of at least half of the width of said connection segment from said resilient portion midpoint.

8. The clip of claim 7, wherein said anchor portion includes a midpoint and said connection segment is attached to said anchor portion so said connection segment midpoint is offset a distance of at least half of the width of said connection segment from said anchor portion midpoint.

9. The clip of claim 7, wherein said resilient portion includes two curved arms extending away from each other, and wherein said curved arms extend away from said connection segment.

10. The clip of claim 7, wherein said anchor portion is substantially planar.

11. A roller bearing assembly comprising:
    a roll cage defining a first and second roller opening for receiving rollers and a first groove between said first and second roller openings, wherein said roll cage includes a linking portion between said first and second openings;
    a first roller positioned in said first roller opening;
    a second roller positioned in said second roller opening;
    a first clip including a first connection segment, a first anchor portion, and a first resilient portion;
    a second clip including a second connection segment, a second anchor portion, and a second resilient portion;
    wherein said first anchor portion is positioned in said first roller opening and said first resilient portion is positioned in said second roller opening with said first connection segment positioned in said first groove and spanning said linking portion;
    wherein said second anchor portion is positioned in said second roller opening and said second resilient portion is positioned in said first roller opening;
    wherein said first resilient portion contacts said first roller and biases said first roller away from said first resilient portion; and
    wherein said second resilient portion contacts said second roller and biases said second roller away from said second resilient portion.

12. The roller bearing assembly of claim 11, wherein an entire length of said first anchor portion abuts said roll cage.

13. The roller bearing assembly of claim 11, wherein said first anchor portion is positioned between said second resilient portion and said roll cage.

14. The roller bearing assembly of claim 11, wherein said second anchor portion is positioned between said first resilient portion and said roll cage.

15. The roller bearing assembly of claim 11, wherein a length of said first connecting segment is at least greater than the length of said first groove plus the thickness of said second anchor portion.

16. The roller bearing assembly of claim 11, wherein said second connection segment of said second clip is positioned in said first groove.

17. The roller bearing assembly of claim 11, further comprising a second groove and wherein a separation portion of roll cage is positioned between said first groove and said second groove.

18. The roller bearing assembly of claim 11, wherein a width of said connection segment is no more than half a width of the first groove in the roll cage.

* * * * *